United States Patent [19]
Schumann

[11] 3,836,851
[45] Sept. 17, 1974

[54] DIGITAL OSCILLOSCOPE CONTROL APPARATUS

[75] Inventor: Robert W. Schumann, Madison, Minn.

[73] Assignee: Nicolet Instrument Corporation, Madison, Wis.

[22] Filed: Mar. 8, 1973

[21] Appl. No.: 339,180

[52] U.S. Cl............. 324/112, 324/102, 324/121 R, 340/347 AD
[51] Int. Cl..... G01r 1/00, G01r 19/00, G01r 13/32
[58] Field of Search............... 324/112, 121 R, 102; 340/347 AD

[56] References Cited
UNITED STATES PATENTS
3,662,380 5/1972 Cargile.......................... 340/347 AD

*Primary Examiner*—Alfred E. Smith
*Assistant Examiner*—Ernest F. Karlsen
*Attorney, Agent, or Firm*—Lew Schwartz; Wayne Silvertson

[57] ABSTRACT

A digital oscilloscope having improved control apparatus which comprises first means for providing a single signal to control apparatus which will arm the oscilloscope to receive and hold only the next properly triggered input signal; second means for providing a single signal to the control apparatus which will then control the oscilloscope to hold the last properly measured signal and not to receive any further signals for measurement; and third means for providing a single signal to the control apparatus for placing the oscilloscope into a normal mode of operation. All of the first, second or third means may be manually or remotely operated.

14 Claims, 1 Drawing Figure

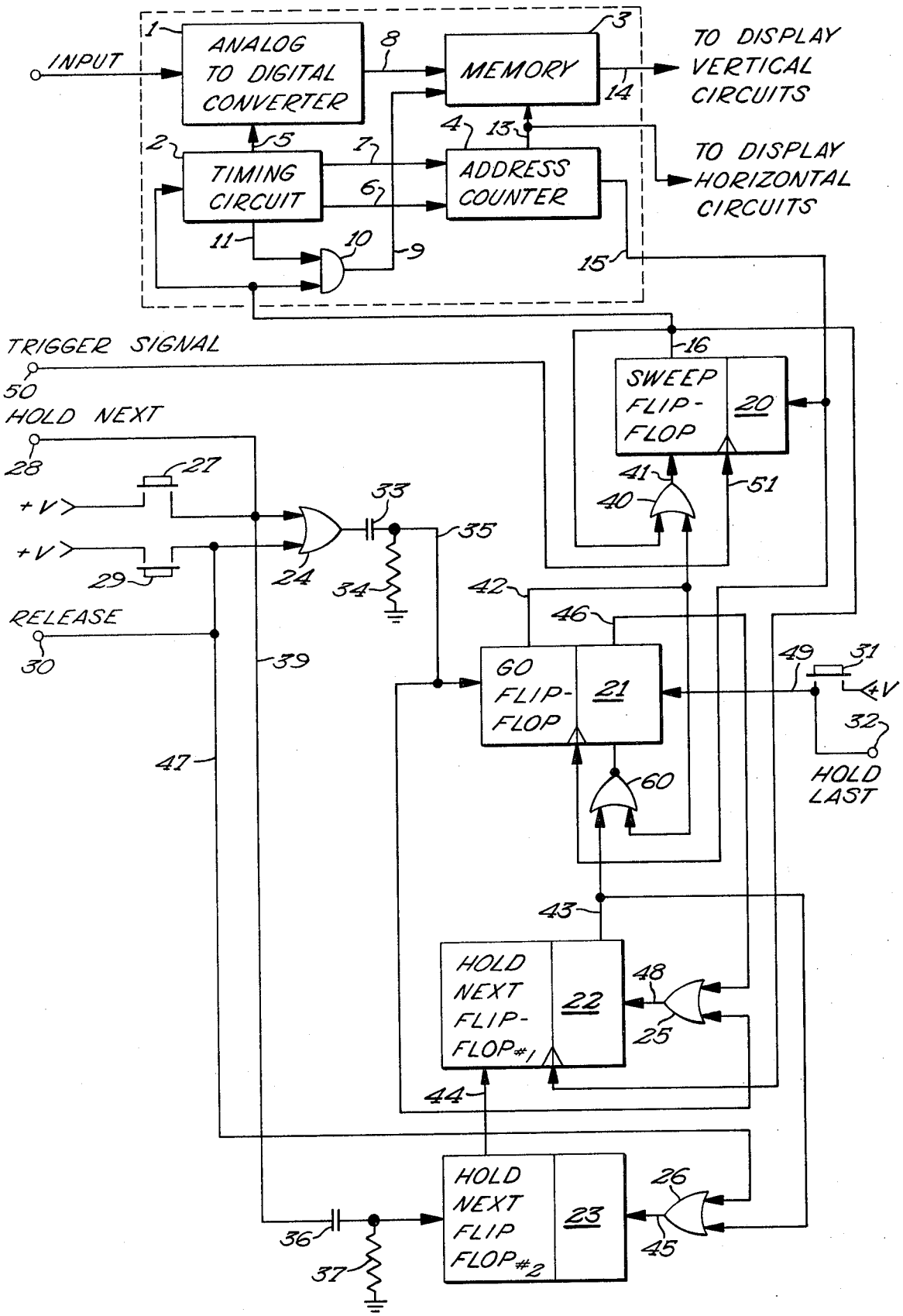

DIGITAL OSCILLOSCOPE CONTROL APPARATUS

BACKGROUND OF THE INVENTION

Digital instruments for measurement, recording and display of time varying signals are becoming increasingly practical as replacements for the well-known analog oscilloscopes and analog storage oscilloscopes. It is generally known that because of lower costs and higher operational bandwidths it has become more practical to use digital oscilloscopes in the situations where they are advantageous over analog oscilloscopes. Such advantages include the facts that digital oscilloscopes are capable of much greater accuracy than analog oscilloscopes, that ditigal memories can record greater amounts of information than can be stored on the screen of analog storage oscilloscopes, and that the digital form of stored data is more generally useful than the charge pattern on a screen used by analog oscilloscopes.

Prior to the solution of the cost and bandwidth problems, digital oscilloscopes were only used for special purposes, such as interfacing between an information source and a digital computer. These special purpose instruments are inconvenient for use in those roles in which visual inspection of signal waveforms is the principle objective of the operator, which has been the traditional role of the analog oscilloscope. There has been a tendency in the prior art to use the familiar analog oscilloscope controls and nomenclatures when adapting digital instruments to use for visual inspection of signal waveforms. However, this invention recognizes that what is optimum control and nomenclature for analog oscilloscopes is not necessarily optimum for digital oscilloscopes.

It is therefore a major object of the apparatus of this invention to provide digital instrumentation with facilities for greater ease of operation and for greater versatility of use, with a minimum of external apparatus.

The apparatus of this invention has a further advantage in that the improved design of the control functions is such as to allow easy duplication of actions by remote control.

SUMMARY OF THE INVENTION

Briefly described, the apparatus of this invention comprises three selectable controls which, in the preferred embodiment, may be manually or remotely controlled with ease of operation. A first control enables the operator to remotely or manually select a mode of operation, called the "hold last" mode, whereby the digital oscilloscope will hold and display the last signal to have been measured in the oscilloscope. This is accomplished through the use of a single signal from a pushbutton switch, remote control or other form of signal providing means. A central control apparatus places the oscilloscope in the desired mode of operation in response to the single signal. A second means may be selected by the operator in the same manner to provide another single signal to the control apparatus which places the oscilloscope in a mode whereby it will accept and hold only the next properly triggered signal to enter the oscilloscope. This mode is referred to as the "hold next" mode. There is also provided a third means which may be operated by the operator in the same manner to provide a single signal to the control apparatus which will return the oscilloscope to a normal mode of operation.

BRIEF DESCRIPTION OF THE DRAWING

The single figure of the drawing constitutes a block diagram of a digital oscilloscope utilizing the apparatus of this invention.

DESCRIPTION OF THE PREFERRED EMBODIMENT

To best understand the advantages and operation of the apparatus of this invention, there will first be given a description of the manner of operation of certain prior art digital instruments.

The most common name given to digital instruments for measurement, recording and display of waveforms of time varying signals has been "transient recorders." A typical one of such prior art transient recorders is the Biomation, Inc., model 610B.

In such transient recorders there are several incidental controls, not having any association with the improved and novel controls of the apparatus of this invention. Such incidental controls include sweep speed and various sweep trigger controls, signal sensitivity, and DC signal offset controls. These are closely analogous to the corresponding controls of analog oscilloscopes and are well-known to those familiar with the art.

An important nomenclature difference between analog and digital oscilloscopes is the meaning of the term "sweep." In the case of analog oscilloscopes, sweep refers to the horizontal sweep of the cathode-ray tube beam across the face of the viewing screen. During this sweep, the vertical deflection is controlled, essentially instantaneously, by the time varying input signal. The result is to produce the well-known rectangular coordinate plot of signal amplitude versus time. The time scale depends upon the sweep speed in use.

In digital oscilloscopes it is quite common that no such direct beam control be involved. During the occurrence of an input signal it is measured at many equally spaced time intervals and the values measured are recorded address sequentially in a digital memory. The display of the stored data may occur concurrent with the signal measurement and recording operations or may be generated after the signal has been measured and recorded. For the purpose of description herein, it will be assumed that the display is generated concurrently with the signal measurement in the following manner. Whenever the memory circuits are not preoccupied with the recording of one of their measured values, the memory is interrogated address sequentially, with the recorded values and associated address number being applied to suitable digital-to-analog converters. The coordinate points are positioned on the screen according to the signal values and address numbers, to provide the indication of signal amplitude versus time. The display may be assumed to be continuous, that is, whatever waveform information is in memory is constantly produced as a waveform on the screen.

There need be no definite relationship between the position on the screen of the beam at a given moment and the then existing signal amplitude. There are variations on this manner of producing the display, but in the description of this invention the essential matter is how the data measurement and recording process take place, not how the recorded data are displayed.

It is thus apparent that the term "sweep," in the case of digital oscilloscopes, has nothing to do with the movement of the cathode-ray tube beam. Therefore, for the purposes of this description, "sweep" will be defined as those processes which take place during a signal occurrence and involve the measurements and recordings of that signal.

A sweep is started by some kind of timing signal. That signal is called the sweep trigger or trigger signal in this descrption. As is well-known the sweep trigger may be some externally produced signal related to the timing of the signal being measured or it may be some feature of the signal being measured such as a prominent spike, or it may be some signal quite unrelated to the signal being measured. No matter what the actual signal may be, any predetermined or identifiable event which initiates the sweep shall be referred to herein as the sweep trigger or trigger signal.

The meaning of the term "sweep speed" is well-known to those familiar with analog oscilloscopes. It is the speed at which the beam sweeps across the face of the display surface. In digital oscilloscopes of the kind being described herein, sweep speed refers to the rate at which measurements of input signal amplitudes are made and recorded. There need be no relationship between this measurement rate and the speed of movement of the display cathode-ray tube beam.

For further ease of description, the term "transient recorder" will refer to digital signal measurement devices of the kind not utilizing the apparatus of this invention, while the term digital oscilloscope will be used to mean those digital instruments for signal measurement and display which do use the apparatus of this invention.

Referring now to the single figure of the drawing there is shown in dotted lines data acquisition and display circuitry which is of a design well-known in the prior art and which may have other various configurations. An analog-to-digital converter 1 (hereinafter referred to as ADC 1) has an input connected to a signal input terminal for receiving the signal to be measured. ADC 1 has another input connected to a timing circuit 2 through a cable 5. An output of ADC 1 is connected through a cable 8 to an input of a memory 3. Memory 3 is connected through a cable 14 to the vertical circuits of a display unit (not shown).

Timing circuit 2 has an input connected to a sweep signal to be more fully described below. Timing circuit 2 has a pair of outputs connected through cables 6 and 7 to a pair of inputs on an address counter 4. Address counter 4 has a first output connected through a cable 13 to an input on memory 3 and to the horizontal circuits of the display unit. A second output of address counter 4 is connected to a cable 15 to provide an end of sweep signal utilized in a manner described below.

Also shown within the dotted lines of the drawing is an AND gate 10 having a first input connected to the sweep signal to be described below and a second input connected through a cable 11 to another output on timing circuit 2. The output of gate 10 is connected through a cable 9 to an input on memory 3.

Referring now to that portion of the single figure of the drawing not within the dotted lines, there is shown a sweep flipflop 20 having a sweep output cable 16 connected to the above described inputs of timing circuit 2 and AND gate 10. A trigger signal input terminal 50 is connected through a cable 51 to the clock input of sweep flip-flop 20. An OR gate 40 has an output connected through a cable 41 to an input of the on side of flip-flop 20. A first input of gate 40 is connected to cable 16, and a second input on gate 40 is connected through a cable 42 to an output of the on side of a GO flip-flop 21. Cable 15 from address counter 4 is connected to a reset input of the off side of flip-flop 20 and to a clock input of flip-flop 21.

An OR gate 24 is connected through a capacitor 33 and a cable 35 to a set input of the on side of flip-flop 21. A resistor 34 is connected between cable 35 and ground. A first input of OR gate 24 is connected through a hold next remote control input terminal 28 and through a normally open switch 27 to a source of voltage. A second input on gate 24 is connected to a release remote control signal input terminal 30 and through a normally open switch 29 to a source of voltage.

An output terminal of the off side of flip-flop 21 is connected through a cable 46 to the input of an OR gate 25. The output of gate 25 is connected through a cable 48 to an input on the off side of a flip-flop 22. Another input on gate 25 is connected to cable 35. A reset input to the off side of flip-flop 21 is connected through a cable 49 to a hold last remote control signal input terminal 32 and through a normally open switch 31 to a source of voltage. A gate 60 has its output connected to an input on the off side of flip-flop 21. A first input on gate 60 is connected to cable 42 and a second input on gate 60 is connected through a cable 43 to an output of the off side of flip-flop 22.

Cable 16 is connected to the clock input of flip-flop 22. An input of the on side of flip-flop 22 is connected through a cable 44 to an output of the on side of a flip-flop 23. An OR gate 26 has an output connected through a cable 45 to a reset input of the off side of flip-flop 23. A first input on gate 26 is connected through a cable 47 to release switch 29 and release input terminal 30. A second input on gate 26 is connected to cable 43. A cable 39 connects hold next terminal 28 and switch 27 through a capacitor 36 and a cable 61 to a set input terminal of the on side of flip-flop 23. A resistor 37 is connected between cable 61 and ground.

To best understand the description of the operation of the apparatus of this invention it should be understood that flip-flop 20, 21, 22 and 23 are D type flip-flops with a type of operation and design well-known to those skilled in the art. For east of explanation and description, as they appear in the drawings the left hand portion of each flip-flop is referred to as the "on" side while the right hand portion is referred as the "off" side. It will be recognized by those skilled in the art that the outputs of either the on or the off side may be positive or negative depending on the state of the flip-flop.

Whenever the on side of flip-flop 20 is positive, a sweep signal will appear on cable 16. This signal will be felt at timing circuit 2 causing periodic timing pulses to be transmitted through cable 5 to ADC 1, beginning essentially instantly with the start of the sweep demand positive voltage on cable 16, and repeating at generally uniform time intervals. The lengths of the intervals between timing pulses is commonly selectable by the operator. The timing pulses continue as long as the sweep signal on cable 16 is positive. Each such timing pulse causes ADC 1 to measure the input signal voltage, and to deliver the numerical value measured through cable 8 to memory 3. For a binary ADC of $n$ bits including sign, cable 8 would have $n$ wires. The binary voltage values delivered through cable 8 to memory 3 are recorded in memory at addresses corresponding to the state of address counter 4, delivered to memory 3 through cable 13. The number of wires in cable 13 depends on the size of memory 3. For a memory having $2^m$ word storage locations, the addresses have $m$ bits in general, and the address counter has $m$ bits.

The function of AND gate 10 is to pass or block write timing commands transmitted through cable 11 from timing circuit 2. If cable 16 is positive when the signals appear on cable 11, the output of gate 10 will be felt through cable 9 at the input of memory 3. In the absence of such write commands, the contents of memory 3 are not altered. The write commands are timed to occur after a sufficient time following the start of each voltage measurement to allow ADC 1 to have completed the measurement. Address advance pulses are applied from timing circuit 2 to address counter 4 through cable 7. Generally, such advance pulses follow the timing pulses to ADC 1 and write pulses to memory 3 immediately after the write operation has ended.

It is a design option whether or not the measurement commands to ADC 1 continue after the sweep command on cable 16 ends, but it is generally preferable that they stop in the absence of the sweep command in order that they can begin in accurate time synchronism with the start of the next sweep command. The write command pulses stop when the sweep command ends, to avoid altering the data in memory 3 except during a sweep sequence. At all times, timing circuit 3 produces periodic address advance pulses through cable 17 to address counter 4 which cause memory 3 to be addressed sequentially in order to allow information to be displayed in intervals during as well as between sweep operations. For purposes of simplicity, it is assumed that during a sweep cycle, the address advance pulses occur at the same rate as the timing pulses to ADC 1, and the write commands and that they follow the write pulses immediately. At times other than during a sweep, the frequency of the address advance pulses may be arbitrary and depend on how frequently it is desired to read the contents of memory 3 to the display circuits.

Coincident with the start of each sweep command on cable 16, an address reset pulse is delivered from timing circuit 2 through conductor 6 to address counter 4, to insure that the state of address counter 4 is zero at the start of each sweep sequence.

The digital voltage values read from memory 3 are delivered through cable 14 to the vertical circuits of the display mechanism (not shown), and the corresponding address information is delivered through cable 13 to the horizontal circuits of the display apparatus (not shown). Thus, the measured voltage values from memory 3 control the display vertical positioning, and the address information from counter 4 controls the display horizontal positioning.

After the last address advance pulse that occurs during each sweep cycle, an end of sweep pulse is delivered from address counter 4 through conductor 15 to sweep flip-flop 20, to turn off the sweep command signal on cable 16. Such end of sweep pulses are generated only during a sweep, and not during memory readout operations when no sweep is in progress. This is to avoid the possibility of interfering with a sweep sequence which happens to begin at about the same time as such end of sweep pulses.

As mentioned above, the portion of the single FIGURE of the drawing shown in dotted lines may be the subject of a number of variations which may provide for different display appearances and for various other operations not involving the sweep control apparatus for this invention. Whatever form other designs of that portion of the drawing may take, they are generally controlled by a signal corresponding to the sweep command appearing on cable 16, and an end of sweep signal pulse is generally required to terminate the sweep sequence.

In the apparatus of this invention there is provided a capability of accepting and holding the "last" signal or the "next" signal, or reviewing each signal accompanied by an acceptable sweep trigger signal. The desired mode is achieved by depressing switches or providing remote control signals which are labeled "hold last," "hold next," and "release." This is a particularly advantageous arrangement in that only a single action need be taken by the operator to hold the next signal, rather than two separate actions as required in the prior art.

Referring again to the single FIGURE of the drawing, the hold next, release and hold last command signals are produced on conductors 39, 47 and 49, respectively, by the actions of pushbutton switches 27, 29 and 31 when these are depressed, or by externally produced voltages introduced through terminals 28, 30 and 32. In each instance, a single signal is provided to inform the control apparatus of the mode selected. These single command signals cause the setting or resetting of various flip-flops in the manner described below.

Sweep flip-flop 20 is a D type flip-flop which assumes a state such that the sweep signal on conductor 16 goes positive whenever a trigger signal is applied to flip-flop 20 from terminal 50 through cable 51, and the voltage on conductor 41 from gate 40 is positive. Flip-flop 20 is cleared to a state wherein the voltage on line 16 is negative whenever the sweep end command from address counter 4 occurs on cable 15.

A "GO" signal is provided by flip-flop 21 on cable 42. Whenever the signal on cable 42 is positive, gate 40, which is a positive OR gate, causes conductor 41 to be positive. Gate 40 holds conductor 41 positive whenever the signal on cable 16 is positive so that regardless of whether or not the signal on cable 42 becomes negative during a sweep sequence, trigger pulses occurring during the sweep will not cause the state of flip-flop 20 to change. Only the sweep end pulse on cable 15 can turn flip-flop 20 to the off state. When flip-flop 21 is in the on state, the GO signal on cable 42 is positive, and the oscilloscope will be receptive to all sweep trigger pulses which occur; except that if a sweep is already in progress, sweep trigger pulses then occurring will be ignored in the sense that since flip-flop 20 is already on, another sweep trigger pulse will not cause any change in state. In this discussion, times during which the GO signal on cable 42 is positive or the sweep signal on cable 16 is positive, will be referred to as times when the instrument is active; all other times will be considered as inactive times, when the only operations occurring will be read out of memory and display operations.

Flip-flop 21 is turned off instantly when a hold last command from switch 31 or terminal 32 is produced and transmitted to flip-flop 21 through cable 49. From that moment on, no further sweep trigger pulses will have effect on flip-flop 20. The signal corresponding to the last accepted trigger signal will either have been recorded, or may be in the process of being recorded when the hold last command occurs. Therefore, the desired effect will have been achieved and the last signal to have been recorded will be held in memory for display and study by the operator.

Either of two signal pulses will turn flip-flop 21 to the GO state which is the equivalent of making cable 42 positive. A first of the signal pulses is the hold next command signal from either pushbutton 27 or terminal 28, and the second signal pulse is the release command from either pushbutton 29 or terminal 30. These two signals are applied through conductors 39 and 47 to positive OR gate 24, the output of which is transmitted through an RC coupling circuit comprising capacitor 33 and resistor 34, and through a conductor 35 to the set terminal of flip-flop 21. Either of these commands will render the oscilloscope active, thus removing the hold last mode of operation. The RC coupling circuit comprising capacitor 33 and resistor 34 insures that the action is momentary, regardless of how long the release or hold next signals may endure.

As described above, a hold last command pulse can turn flip-flop 21 to the off state, that is, remove the positive signal from cable 42. The same result can occur in another series of events. Flip-flop 21 is a D type flip-flop, which in response to the sweep end pulse transmitted to its clock input through cable 15, will be turned off if the signal applied to its off side input from gate 60 is positive.

It is desired that the signal to be held in memory 3 for display or other purposes, following a hold next command, be that signal which is the next to start. Flip-flop 22 is connected in such a way that it cannot be turned on, in preparation for turning off the GO signal from flip-flop 21, except by the leading edge of the sweep signal from cable 16. Flip-flop 22 is a D type flip-flop which is responsive to a positive going signal applied to its clock input, and will assume the on state if the input to its on side is positive during that positive transition. The input terminal to the on side of flip-flop 22 is made positive, as will be described, at essentially the instant a hold next command occurs. Therefore, when the next sweep signal to begin thereafter produces a positive voltage transition at the clock input of flip-flop 22, flip-flop 22 will be turned to the on state. This makes flip-flop 21 receptive to the sweep end pulse which follows later on cable 15, and flip-flop 21 will then be turned off.

It is desired that the sweep end pulses which are applied to the clock input of flip-flop 21 have no effect beyond turning that flip-flop off. That is, if flip-flop 21 is already in the off state, it is not desired to have a possible sweep end pulse on cable 15 cause it to be turned on again. To avoid this, gate 60 has been provided. Gate 60 produces a positive output if either of its two inputs is negative. If the GO signal on cable 42 is negative, then the output of gate 60 is necessarily positive, so positive clock transitions at the trigger input of flip-flop 21 will have no effect and flip-flop 21 will remain in the off state. If the input on cable 43 from the off side of flip-flop 22 is negative, this has the effect of providing a positive signal at the output of gate 60 thus causing flip-flop 21 to be switched to the off state when a positive signal appears on cable 15.

The sole function of flip-flop 23 is remembering that a hold next command has been given. A steady positive voltage applied to the input on the on side of flip-flop 22 would serve the same purpose as the output signal on cable 44 from flip-flop 23, but this would require that the positive voltage be maintained for an indeterminate length of time. Therefore, flip-flop 23 is caused to be turned to the on state by the leading edge of a hold next command appearing on conductor 39, which is transmitted through the RC coupling circuit comprising capacitor 36 and resistor 37, and thence through conductor 61 to the set terminal of flip-flop 23. Thus turn-on of flip-flop 23 causes the signal on cable 44 to go positive. Flip-flop 23 is turned off as soon as it has accomplished its purposes of turning on flip-flop 22, and it is also turned off by application of a release command. The signal on cable 43 from flip-flop 22 is transmitted to positive OR gate 26, and the release command from pushbutton switch 29 or terminal 30 is transmitted to gate 26 through conductor 47. The output of gate 26 is connected to the reset terminal of flip-flop 23 through conductor 45, and thus the appearance of either signal at an input of gate 26 will cause flip-flop 23 to change states and make the signal on cable 44 go negative.

When flip-flop 22 has performed its function of turning off flip-flop 21, it is turned off by the action of the signal applied through conductor 36 through positive OR gate 25, the output of gate 25 being connected through conductor 38 to the reset terminal of flip-flop 22. The same effect is achieved if either a hold next or release signal occurs, resulting in a positive signal on cable 35 being felt through gate 25 on the reset input terminal of flip-flop 22.

From the above described operation it is apparent that through the three controls described the operator has the advantages of speed and ease of operation of the oscilloscope he is using to measure waveforms. It is not necessary that the three controls be pushbuttons as described above, the essential fact being that there be three controls, which when actuated to provide a single signal results in the corresponding action of: allowing acceptance, measurement, recording and display of the next signal accompanied by a suitable sweep trigger signal; preventing further signals from being accepted, thereby in effect causing the last accepted signal to be retained and displayed; and, allowing all otherwise acceptable signals to be accepted, measured, recorded and displayed.

The apparatus of this invention results in a significant advantage in ease of operation over the multiple steps and multiple control arrangements of prior art transient recorders. It has other advantages in the fact that the signal from any of the three pushbuttons is readily duplicated by external remote control apparatus which can react more rapidly than a human operator to an event indicating that one of the three control actions should be taken. All of the control actions are accomplished by the use of a single signal, something which does not appear in prior art transient recorders, which require complex circuitry for remote control.

From the preceding description of the apparatus of this invention it will be apparent that any one of the three functions could be deleted from the device if that function is not needed. Some digital oscilloscopes, for example, may have only the hold last and release controls if this provides suitable flexibility.

It is also apparent that there can be more than three controls. In the above described preferred embodiment, the result of the hold next control being actuated is to cause acceptance of the next otherwise acceptable sweep trigger signal, and only that one, with the result that one more signal would be accepted and recorded. However, when that pushbutton action or externally provided hold last command occurs it may be that a sweep is already in progress and if a sweep trigger signal then occurs it will not be effective. Only when the first sweep trigger following the sweep already in progress occurs will a sweep trigger signal be considered to have occurred by the instrument. This means that the hold last command will not in fact cause the next sweep trigger pulse to be accepted, in every case. That command, in this preferred embodiment, causes the next signal to occur following both the command and the last previously started sweep, to be accepted and recorded.

Such an action of the hold last command is preferred by certain operators. However, it would be possible to provide a fourth pushbutton or control command which would have the action of instantly ending any sweep in progress in order to render the instrument sensitive to the next sweep trigger signal with no qualifications. Such a controlled pushbutton might be labeled for example "priority hold next," or some comparable name.

It is also apparent that circuitry other than that described in the above preferred embodiment may be devised to achieve the same purpose as the apparatus of this invention, and that the above description is only that of a preferred embodiment and does not in any sense limit the scope of the invention related to the use of separate single signal controls to provide the operator of digital oscilloscope with ease of operation and selection of mode.

What is claimed is:

1. In digital measurement and display apparatus, including input means for receiving an input signal, measurement means connected to the input means for measuring the input signal, memory means connected to the measurement means for storing measurement data, display means connected to the memory means for displaying stored data, sweep means having means responsive to a predetermined trigger signal, and the sweep means connected to the measurement means for controlling operation thereof in response to a trigger signal, the improved control apparatus comprising:
   selectively operable hold next means for providing a single signal;
   control means connected to the hold next means and the sweep means;
   the control means including means responsive to the single signal from the hold next means for arming the sweep means to respond to the next predetermined trigger signal and for thereafter inhibiting further response of the sweep means;
   selectively operable release means for providing a single signal;
   means connecting the release means to the control means; and
   the control means including means responsive to the single signal from the release means for releasing further inhibit of the sweep means.

2. The apparatus of claim 1 including:
   selectively operable hold last means for providing a single signal;
   means connecting the hold last means to the control means; and
   the control means including further means responsive to the single signal from the hold last means for inhibiting operation of the sweep means.

3. The apparatus of claim 2 including:
   means for remotely controlling selection of the hold next means, the release means, and the hold last means.

4. The apparatus of claim 1 in which:
   the hold next means and the release means each comprise single switch means.

5. The apparatus of claim 2 in which:
   the hold last means comprises single switch means.

6. The apparatus of claim 4 in which:
   the single switch means comprise pushbutton switch means.

7. The apparatus of claim 5 in which: the single swtich means comprises pushbutton switch means.

8. In digital measurement and display apparatus, including input means for receiving an input signal, measurement means connected to the input means for measuring the input signal, memory means connected to the measurement means for storing measurement data, display means connected to the memory means for displaying stored data, sweep means having means responsive to a predetermined trigger signal, and the sweep means connected to the measurement means for controlling operation thereof in response to a trigger signal, the improved control apparatus comprising:
   trigger signal input means connected to the trigger signal responsive means for normally enabling the sweep means in response to a trigger signal;
   control means connected to the trigger signal responsive means;
   hold next signal means connected to the control means and including selectively operable means for providing a single signal;
   the control means including means responsive to the single signal for preventing enabling of the sweep means after one sweep means enabling trigger signal has occurred following the single signal;
   release means connected to the control means and including selectively operable means for providing a further single signal; and
   the control means including means responsive to the further single signal for allowing the sweep means to be enabled by every predetermined trigger signal following the further single signal.

9. The apparatus of claim 8 including:
   hold last signal means connected to the control means and including selectively operable means for providing another single signal; and
   the control means including means responsive to the another single signal for preventing enabling of the sweep means following the another single signal.

10. The apparatus of claim 8 in which:
    the trigger signal responsive means comprises first bistable means having a first stable state for enabling the sweep means and a second stable state for disabling the sweep means;

means connecting the trigger signal input means to the first bistable means for normally switching the first bistable means to the first state on the occurrence of a predetermined trigger signal;

the means responsive to the single signal comprises second bistable means having first and second bistable states;

gate means connecting the second bistable means to the first bistable means for preventing the first bistable means from switching to the first stable state when the second bistable means is in the second stable state;

the hold next signal means connected to the second bistable means for selectively switching the second bistable means to the first stable state in response to the single signal; and the means responsive to the single signal including further means connected to the first and second bistable means for switching the second bistable means to the second state when one trigger signal has enabled the sweep means following the occurrence of the single signal from the hold next signal means.

11. The apparatus of claim 10 including:

means connecting the release means to the second bistable means and to the further means, for selectively switching the second bistable means to the first stable state on the occurrence of the further single signal.

12. The apparatus of claim 10 including:

means connecting the hold last signal means to the second bistable means for switching the second bistable means to the second stable state on the occurrence of the another single signal.

13. In digital measurement and display apparatus, including input means for receiving an input signal, measurement means connected to the input means for measuring the input signal, memory means connected to the measurement means for storing measurement data, display means connected to the memory means for displaying stored data, sweep means having means responsive to a predetermined trigger signal, and the sweep means connected to the measurement means for controlling operation thereof in response to a trigger signal, the improved control apparatus comprising:

first, second, third and fourth flip-flops each having set and reset input terminals, a clock input terminal, clock gate set and reset input terminals, and set and reset output terminals; the first flip-flop set output terminal connected to the sweep means and the third flip-flop clock input terminal; trigger signal input means connected to the first flip-flop clock input terminal; first, second, third, fourth and fifth gate means each having first and second input terminals and an output terminal; means connecting the first gate output terminal to the first flip-flop clock gate set terminal; means connecting the first gate first input terminal to the first flip-flop set output terminal; means connecting the first gate second input terminal to the second flip-flop set output terminal; hold next signal input means connected to the second gate first input terminal; release signal input means connected to the second gate second input terminal; means connecting the second gate output terminal to the second flip-flop set input terminal and the third gate first input terminal; means connecting the second flip-flop reset output terminal to the third gate second input terminal; means connecting the third gate output terminal to the third flip-flop reset input terminal; means connecting the second flip-flop set output terminal to the fourth gate first input terminal; means connecting the third flip-flop reset output terminal to the fourth gate second input terminal and to the fifth gate first input terminal; means connecting the fourth gate output terminal to the second flip-flop clock gate reset input terminal; means connecting the fourth flip-flop set output terminal to the third flip-flop clock gate set input terminal; means connecting the release signal input means to the fifth gate second input terminal; means connecting the fifth gate output terminal to the fourth flip-flop reset input terminal; means connecting the hold next signal input means to the fourth flip-flop set input terminal; and means connecting the sweep means to the first flip-flop reset input terminal and the second flip-flop clock input terminal for providing an end of sweep signal thereto.

14. The apparatus of claim 13 including:

hold last signal input means connected to the second flip-flop reset input terminal means.

* * * * *